(12) United States Patent
Chan et al.

(10) Patent No.: US 8,205,149 B2
(45) Date of Patent: Jun. 19, 2012

(54) ENHANCED FIND AND REPLACE FOR ELECTRONIC DOCUMENTS

(75) Inventors: Marise Chan, Redmond, WA (US); Tuan Huynh, Seattle, WA (US); Justin M. Maguire, III, Seattle, WA (US); Marcella C. S. Rader, Bellevue, WA (US); Christopher C. Yu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 3124 days.

(21) Appl. No.: 09/755,863

(22) Filed: Jan. 5, 2001

(65) Prior Publication Data
US 2002/0129053 A1    Sep. 12, 2002

(51) Int. Cl.
*G06F 17/00* (2006.01)
(52) U.S. Cl. ......... 715/212; 715/210; 715/217; 715/249
(58) Field of Classification Search .................. 715/503, 715/504, 511, 516, 521, 523, 526, 528, 529, 715/530, 540, 210, 212, 217, 229, 247, 249, 715/255, 271, 273, 275
See application file for complete search history.

(56) References Cited

U.S. PATENT DOCUMENTS

| | | | | |
|---|---|---|---|---|
| 6,006,225 A * | 12/1999 | Bowman et al. | .................. | 707/5 |
| 6,212,512 B1 * | 4/2001 | Barney et al. | ..................... | 707/1 |
| 6,243,071 B1 * | 6/2001 | Shwarts et al. | ............... | 345/823 |
| 6,330,007 B1 * | 12/2001 | Isreal et al. | ..................... | 345/762 |
| 6,442,576 B1 * | 8/2002 | Edelman et al. | ............. | 715/513 |
| 6,525,721 B1 * | 2/2003 | Thomas et al. | ............... | 345/594 |

OTHER PUBLICATIONS

Brian Underdahl "Using Quattro Pro 6 for Windows" published by Que Corporation, Indianapolis, Indiana, 1994, pp. 15, 172, 174, 175.*
"WordPerfect V6.1 User's Guide" published by Novell Inc., Orem Utah, 1994, pp. 160-166.*
"Corel Draw" published by Corel Corporation, Ontario, Canada, 1992, pp. 23, 25.*
Microsoft Excel, About and Format Cells dialog boxes, Copyright 1985-1999, software released by Microsoft, screen cpatures presented on pp. 1-4.*
Brian Underdahl "Using Quattro Pro 6 for Windows" published by Que Corporation, Indianapolis, Indiana, 1994, pp. 192-193.*

(Continued)

*Primary Examiner* — Stephen Hong
*Assistant Examiner* — Gregory J Vaughn
(74) *Attorney, Agent, or Firm* — Merchant & Gould

(57) ABSTRACT

An enhanced find and replace feature for a spreadsheet program module is disclosed. The enhanced find and replace feature allows users to search for terms and attributes across multiple sheets of a workbook. The find and replace feature also allows searches to be performed based on the formatting attributes of a cell as well as the textual or numerical contents of a cell. The enhanced find and replace feature also allows users to perform bulk formatting of cells (even cells without text) in a spreadsheet. In another aspect, the enhanced find and replace feature lists all the results of the find operation in a results list so that the user may choose which result(s) to view and edit. In another aspect, the find and replace feature is modeless so that a user can search for terms or attributes, view a results list, exit the find and replace feature, perform editing functions in the document and then return to the find and replace feature. With modelessness, when the user clicks into a worksheet and clicks back into the find and replace dialog, the search resumes on the current selection in the worksheet.

6 Claims, 15 Drawing Sheets

OTHER PUBLICATIONS

*Interactive constraint-based search and replace*; David Kurlander and Steven Feiner; *Conference Proceedings on Human Factors in Computing Systems*; (1992) pp. 609-618.

*User interface software tools*; Brad A. Myers; *ACM Trans. Comput.-Hum Interact.* 2, 1 (Mar. 1995) pp. 64-103.

*Interactive graphic design using automatic presentation knowledge*; Steven F. Roth, John Kolojejchick, Joe Mattis and Jade Goldstein; *Conference Proceedings on Human Factors in Computing Systems: "Celebrating Independence"* (1994) pp. 112-117.

*A spreadsheet based on constraints*; Marc Stadelmann; *Proceedings of the Sixth Annual ACM Syposium on User Interface Software and Technology* (1993) pp. 217-224.

*Quattro*; C. Barth; *Management Accounting* 71, 1 (Jul. 1989) p. 15.

*Funk Software's Worksheet Utilities: a smart toolkit for 1-2-3 users*; C. Stinson; *Andrew Seybold's Outlook on Professional Computing* 6, 9 (Apr. 27, 1988) pp. 16-17.

\* cited by examiner

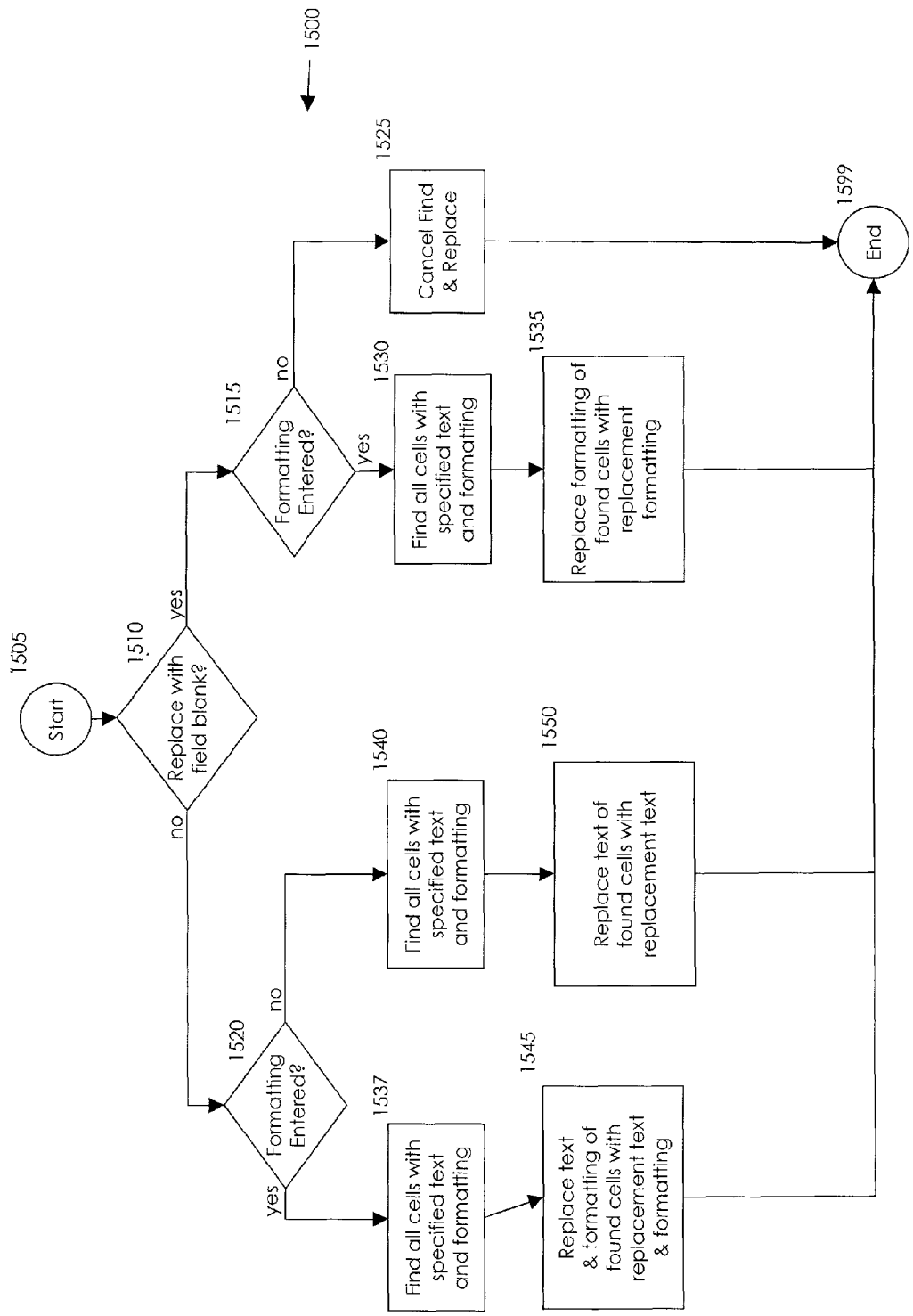

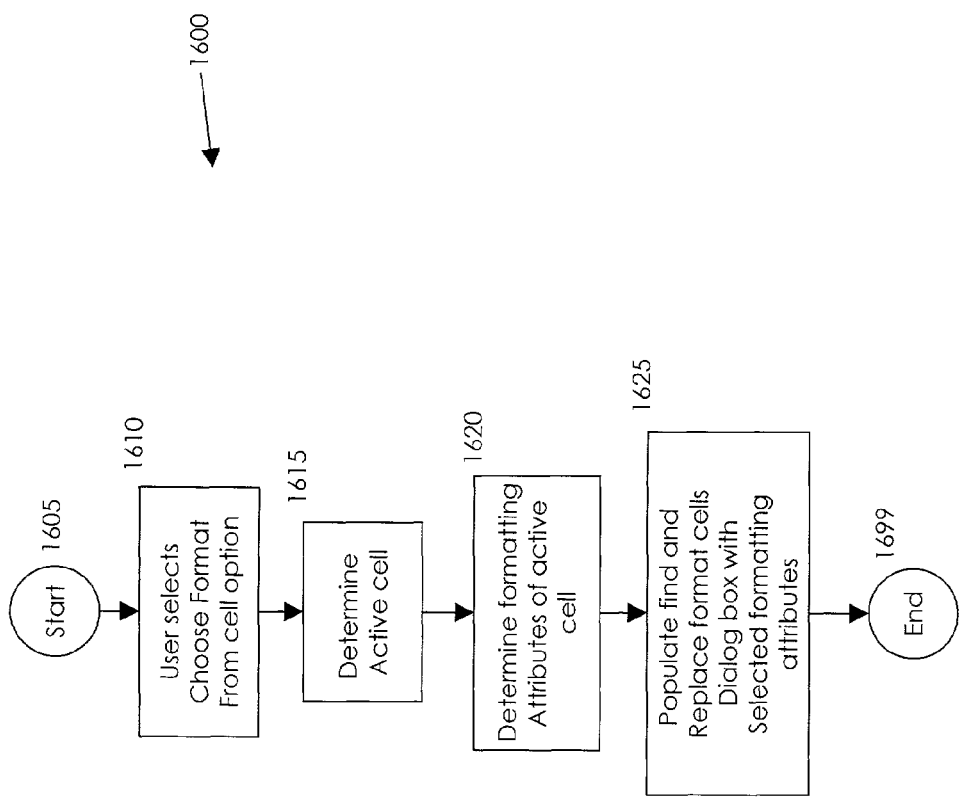

ENHANCED FIND AND REPLACE FOR ELECTRONIC DOCUMENTS

TECHNICAL FIELD

The invention generally relates to electronic spreadsheet program modules, and more particularly relates to an enhanced find and replace feature for electronic documents.

BACKGROUND

The find and replace feature is commonly found in software application program modules to manage the complexities in medium to large documents and data stores. Although most every software application provides some find and replace capability, there is a need for a find and replace feature with ease of use, flexibility in searching, and utility of searching. For example, in most spreadsheet program modules, the find feature is limited to displaying one result at a time and the results of find and replace features are difficult to manage. For example, if the user is searching for a particular instance of a term, the user must navigate through multiple instances of the term to reach the particular instance desired.

A problem with spreadsheet find and replace features is the inability to perform bulk formatting operations. Bulk formatting refers to performing find and replace operations on the formatting attributes of a cell rather than the textual or numerical contents of a cell. For example, bulk formatting may include such operations as deleting all red text, searching only secured sections of a document or searching for data types (such as currencies or numbers in scientific notation).

Another drawback of spreadsheet find and replace features is their inability to search across multiple sheets unless each individual sheet is selected. Thus, a user may perform a find operation and expect that they are searching multiple sheets when, in fact, only the active sheet was searched.

Still another drawback of spreadsheet find and replace features is the inability to perform find and replace operations on non-textual elements of cells. For example, changing all the percentages in a worksheet to decimals must be performed manually rather than via an automated find and replace feature.

SUMMARY OF THE INVENTION

The present invention meets the above-described needs by providing an enhanced find and replace feature for a spreadsheet program module. The enhanced find and replace feature allows users to search for terms and attributes across multiple sheets of a workbook. The find and replace feature also allows searches to be performed based on the formatting attributes of a cell as well as the textual or numerical contents of a cell. The enhanced find and replace feature also allows users to perform bulk formatting of cells (even cells without text) in a spreadsheet. In another aspect, the enhanced find and replace feature lists all the results of the find operation in a results list so that the user may choose which result(s) to view and edit. In another aspect, the find and replace feature is modeless so that a user can search for terms or attributes, view a results list, exit the find and replace feature, perform editing functions in the document and then return to the find and replace feature. With modelessness, when the user clicks into a worksheet and clicks back into the find and replace dialog, the search resumes on the current selection in the worksheet.

That the invention improves over the drawbacks of find and replace features and accomplishes the advantages described above will become apparent from the following detailed description of the exemplary embodiments and the appended drawings and claims.

BRIEF DESCRIPTION OF THE FIGURES

FIG. 15 is a logic flow diagram of a method for performing the replace all operation in accordance with an embodiment of the present invention.

FIG. 16 is a logic flow diagram of a method for performing the choose format from cell operation in accordance with an embodiment of the present invention.

DETAILED DESCRIPTION OF EMBODIMENTS OF THE INVENTION

An embodiment of the present invention will be incorporated into the "EXCEL 10" spreadsheet program module manufactured by Microsoft Corporation of Redmond, Wash. Briefly described, in one embodiment, the invention is an enhanced find and replace feature for the "EXCEL 10" spreadsheet program module. The enhanced find and replace feature allows users to search for terms and attributes across multiple sheets of a workbook. The find and replace feature also allows searches to be performed based on the formatting attributes of a cell and/or the textual/numerical contents of a cell. For example, a search may be performed for all cells with a yellow background or for all cells with decimals, just to name a few.

The enhanced find and replace feature also allows users to perform bulk formatting of cells (even cells without text) in a spreadsheet. For example, a user can change all cells with a yellow background to cells with a red background. In another aspect, the enhanced find and replace feature lists all the results of the find operation in a results list so that the user may choose which result(s) to view and edit. In another aspect, the present invention provides an enhanced find and replace feature with modelessness so that a user can search for terms or attributes, view a results list, exit the find and replace feature, perform editing functions in the document and then return to the find and replace feature. With modelessness, when the user clicks into a worksheet and clicks back into the find and replace dialog, the search resumes on the current selection in the worksheet. In still another aspect of the invention, the find and replace feature dialog comprises a dropdown menu for viewing and selecting previous searches.

Exemplary Operating Environment

Figure 1:
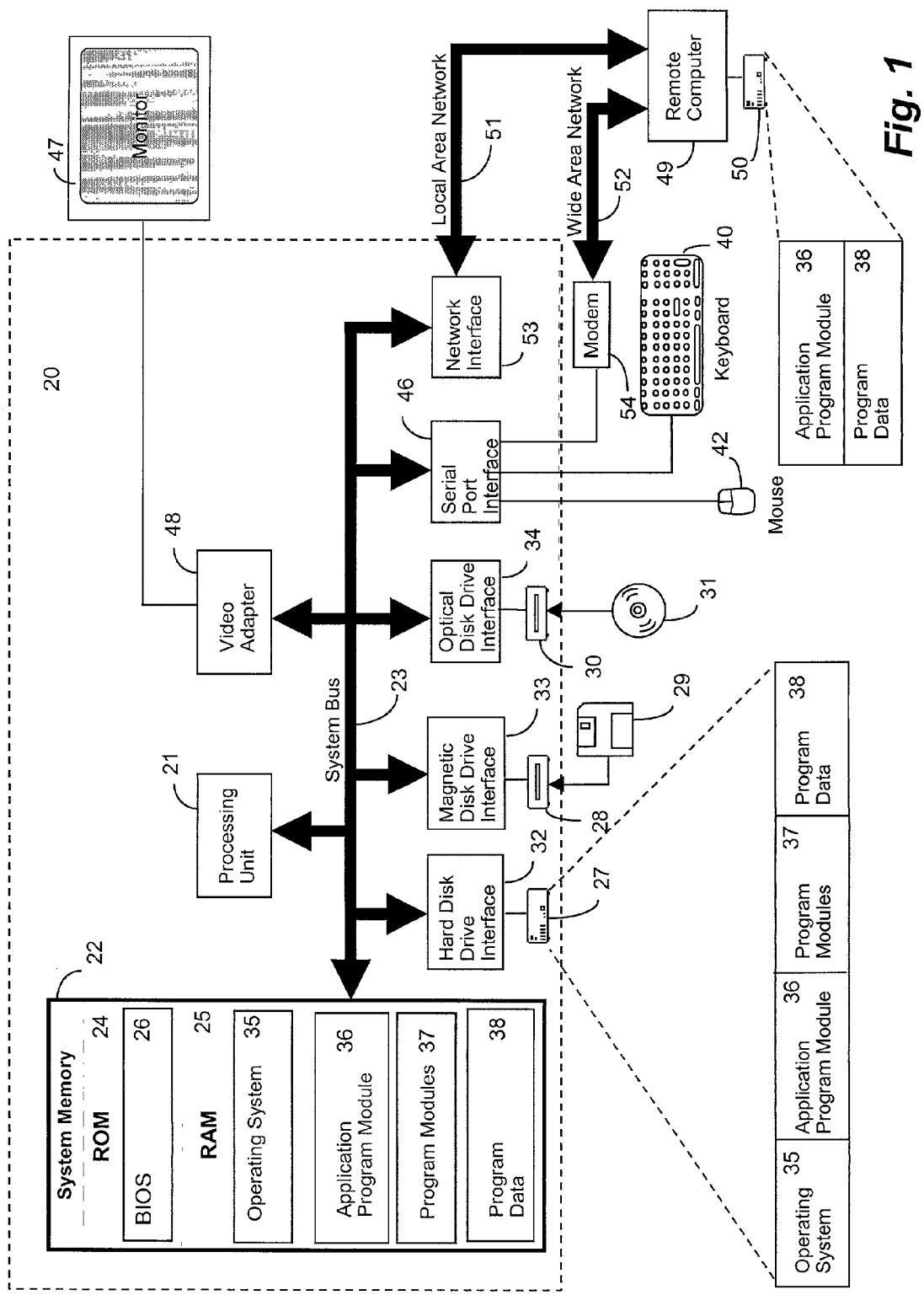
FIG. 1 is a block diagram of a personal computer that provides the operating environment for an embodiment of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, an application program module 36, such as Microsoft's "EXCEL 10" spreadsheet program module, other program modules 37, and program data 38. The application program module 36 may include a find and replace engine (not shown) to implement an embodiment of the present invention. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
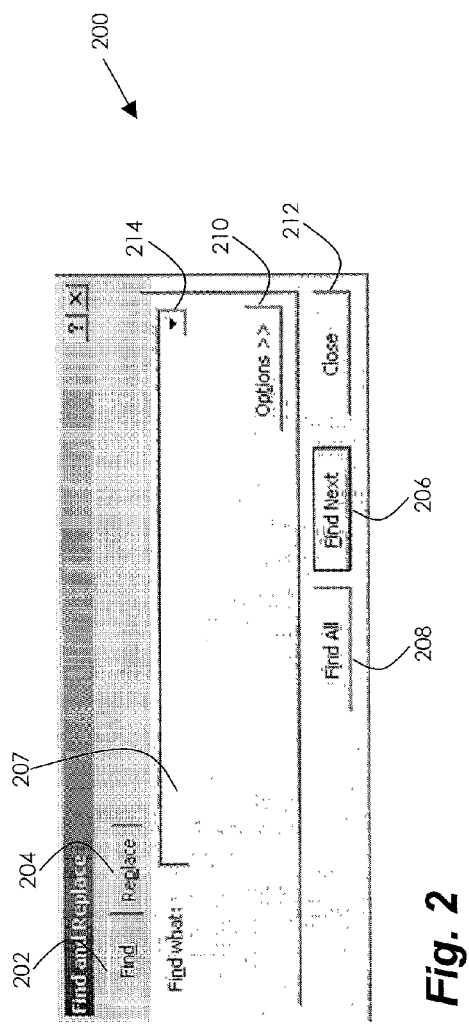
FIG. 2 is an illustration of the slim view of the find and replace dialog box in accordance with an embodiment of the present invention.

FIG. 2 is a slim view 200 of a find and replace dialog box in accordance with an embodiment of the present invention. The slim view 200 of the find and replace dialog box includes a find tab 202 and a replace tab 204. By using the mouse to navigate and click on the find tab and the replace tab, the user may navigate between the find feature and the replace feature. The slim view 200 of the find and replace dialog box further includes a find next button 206. When selected, the find next button 206 will find the next occurrence in the active spreadsheet worksheet of the text and/or formatting entered in the find what field 207 and activate the next cell that matches the find criteria (text and/or formatting). The behavior associated with the find next button 206 is different than other find and replace dialogs because it allows the user to search based on formatting attributes.

The slim view 200 of the find and replace dialog box further includes a find all button 208. When selected the find all button 208 causes the active spreadsheet worksheet and/or any other worksheets in the active workbook to be searched for all occurrences of the text entered in the find what field 207. Which worksheet(s) is searched is controlled by the "within" dropdown in the expanded view. The default is to search within the worksheet. The results of the find all search are shown to the user in a results list (described in reference to FIG. 10).

The slim view 200 of the find and replace dialog box further includes an options button 210. When selected in the slim view 200, the options button 210 will expand the slim view 200 to the expanded view 300 (FIG. 3) so that formatting search options may be entered.

The slim view of the find and replace dialog box further includes a close button 212 that closes the find and replace feature and a dropdown button 214. When selected, dropdown button 214 lists previous searches entered into the find what field 207 so that the user may quickly select a previous search term and then search for that term again.

Figure 3:
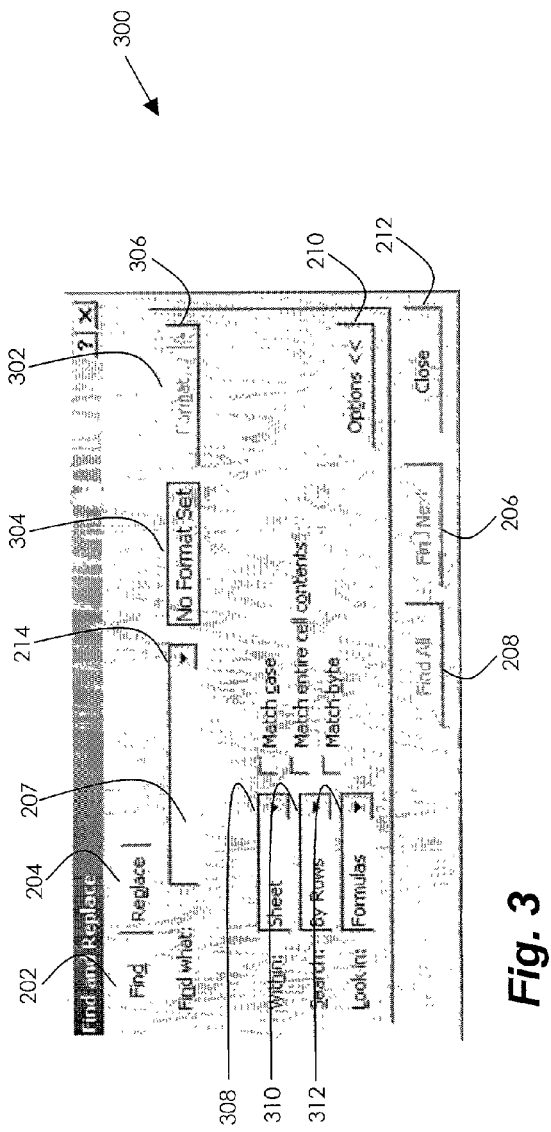
FIG. 3 is an illustration of the expanded view of the find and replace dialog box in accordance with an embodiment of the present invention.

Referring now to FIG. 3, the expanded view 300 of the find and replace dialog box will be described. As described above, when selected in the slim view 200, the options button 210 will expand the slim view 200 to the expanded view 300. Conversely, when selected in the expanded view 300, the options button 210 will reduce the expanded view 300 to the slim view 200.

The expanded view 300 includes a format button 302. When selected, the format button 302 causes a format cells dialog box 400 (FIGS. 4-9) to be displayed. As will be described below, the format cells dialog box allows a user to enter the formatting attributes of the cell and text to be found or the formatting attributes of the cell and text to use as replacements.

The expanded view 300 further includes a format preview 304. After selecting a format to locate or replace with, a sample of the selected format will be displayed in the format preview 304. In FIG. 3, no format has been selected so the format preview displays "No Format Set". The format preview 304 provides the user with a quick visual indication of what formatting attributes will be found should the user select the find all button 208 or the find next button 206. For formatting attributes such as Locked, Hidden or Merged Cells there's no expected preview behavior. Thus, for these attributes, a preferred embodiment of the present invention will add an asterisk to the preview text to illustrate that there are additional formatting attributes beyond those displayed. The formatting attributes that are clearly visible via the preview are font and patterns.

The expanded view 300 also includes a format dropdown button 306. When selected, the format dropdown button includes three options: "Format", "Choose Format From Cell", and "Clear Find Format". When selected, the "Format" option opens the format cells dialog box (FIG. 4) with all options in a ninched state. A ninched state refers to a state that is neither selected nor deselected. For example, suppose you are searching for all cells with the text "Fido". If you deselect blue backgrounds, then any cells with blue backgrounds will not be returned in the search (even if the cells include the text "Fido"). However, if you place the background color in a ninched state, then background color will be ignored in the search and the search will return all cells with the text "Fido" regardless of background color.

When selected, the format dropdown button 306 also displays an option for "Choose Format From Cell". When chosen, the "Choose Format From Cell" option will change the user's cursor into an eyedrop shaped cursor. The user may then move the eyedrop shaped cursor over a cell(s) and select a cell(s). The "Choose Format From Cell" option will determine the attributes of the selected cell(s), apply them to all tabs of the format cells dialog, and enter these attributes into the format preview 304. Thus, a user may use the "Choose Format From Cell" option to simply and quickly search for cells that have the same attributes as a selected cell(s). If multiple cells are selected, the formatting attributes that the cells have in is common are used and the other formatting attributes are ninched. For example, if two cells are shaded red but one has a date and the other has a currency, then the search would be for red cells while ignoring the number formatting attribute.

When selected, the format dropdown button 306 also displays an option for clearing all formats known as the "Clear Find Format" option. This option, when selected, restores all tabs to ninched states. The "Clear Find Format" option is greyed out if no formatting attributes are selected.

The expanded view 300 also includes a within dropdown menu 308, a search dropdown menu 310 and a look in dropdown menu 312. The within dropdown menu allows a user to select a search within a worksheet or within an entire workbook. Thus, the present invention allows a user to search within an entire workbook.

The search dropdown menu 310 allows a user to choose to search by rows or by columns. The look in dropdown menu 312 allows a user to choose to search in formulas, values or comments. The look in dropdown menu is also visible in the replace tab (although the user can only search in formulas in the replace tab). When searching on comments, the formatting options will be greyed out.

Searching for Non-Textual Elements

As described briefly above, in a preferred embodiment of the present invention, the find and replace dialog box is able to search a spreadsheet for both textual and non-textual elements. These non-textual elements are referred to as formatting attributes and may be arranged into the following categories: number, alignment, font, border, patterns and protection.

However, because of ninched state limitations, a user will not be able to search for items using "not", such as not m/d/yy or not blue fill color.

Figure 4:
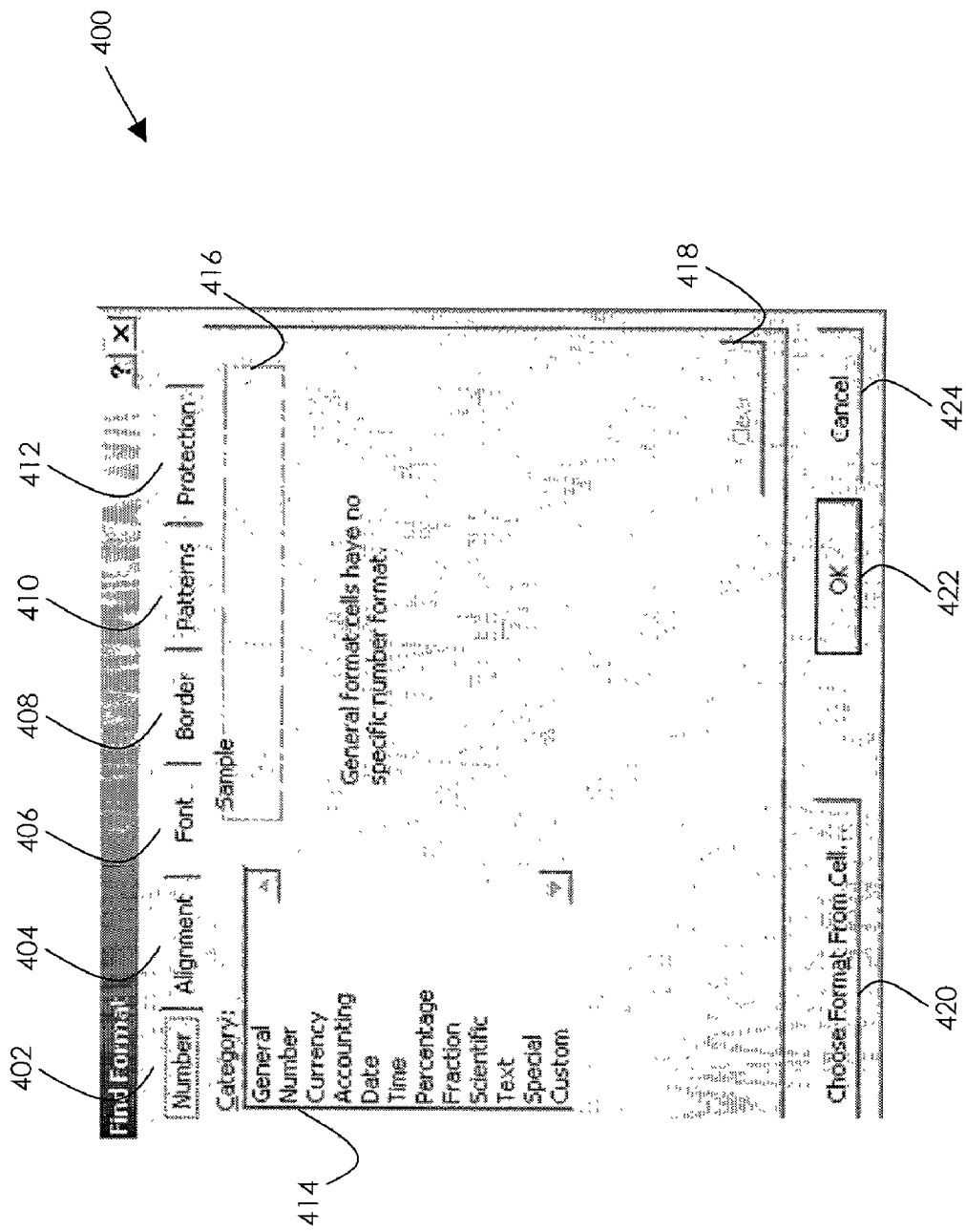
FIG. 4 is an illustration of the format cells dialog box with the Number tab selected.

Referring now to FIG. 4, the format cells dialog box 400 is illustrated with the Number tab 402 selected. With the Number tab selected, the format cells dialog box 400 is used to set the number formatting for the find or replace feature. In addition to the Number tab 402, the format cells dialog box comprises an Alignment tab 404, a Font tab 406, a Border tab 408, a Patterns tab 410, and a Protection tab 412.

The Number tab 402 comprises a category list 414 with a plurality of number types that may be selected such as General, Number, Currency, Accounting, Date, Time, Percentage, Fraction, Scientific, Text, Special and Custom. The user may select one of the categories in the category list to search for this type of number or to replace a cell(s) with this type of number. For example, a user may select to find all cells that are fractions and change them to decimals.

If the user has selected a number type, then a sample of the number type is displayed in the number type preview 416. For example, if the user chooses the decimal number type, then "0.999" (or another decimal number) may be displayed in the number type preview 416.

The Number tab 402 also includes a clear button 418. When selected, the clear button returns any previously selected formatting number attributes to the ninched state.

The format cells dialog box 400 also includes a Choose Format from Cell button 420. When selected, the Choose Format from Cell button 420 functions as the "Choose Format From Cell" option and it will change the user's cursor into an eyedrop shaped cursor. The user may then move the eyedrop shaped cursor over a cell(s) and select a cell(s). The attributes of the selected cell(s) will be determined and applied to all tabs of the format cells dialog. Of course, the cell may also be selected before clicking the Choose Format from Cell button 420.

The format cells dialog box 400 also includes an OK button 422 for accepting the entered formatting attributes and a Cancel button 424 for exiting the format cells dialog box.

Figure 5:
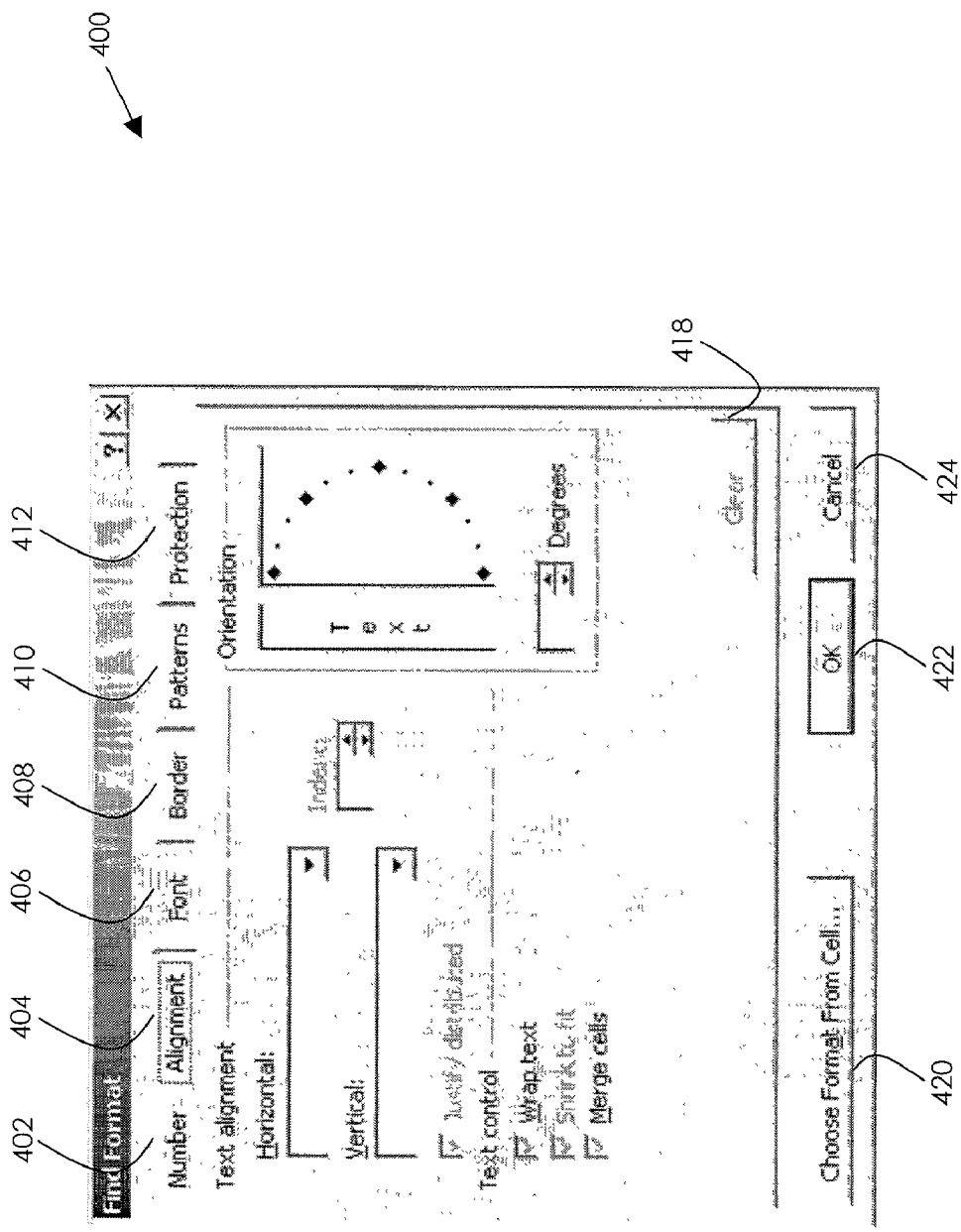
FIG. 5 is an illustration of the format cells dialog box with the Alignment tab selected.

Referring now to FIG. 5, the format cells dialog box 400 is illustrated with the Alignment tab 404 selected. With the Alignment tab selected, the format cells dialog box 400 is used to set the alignment formatting for the find or replace feature. For example, using the Alignment tab, a user may select the text alignment, text control and orientation of the text to be searched for in the worksheet.

Figure 6:
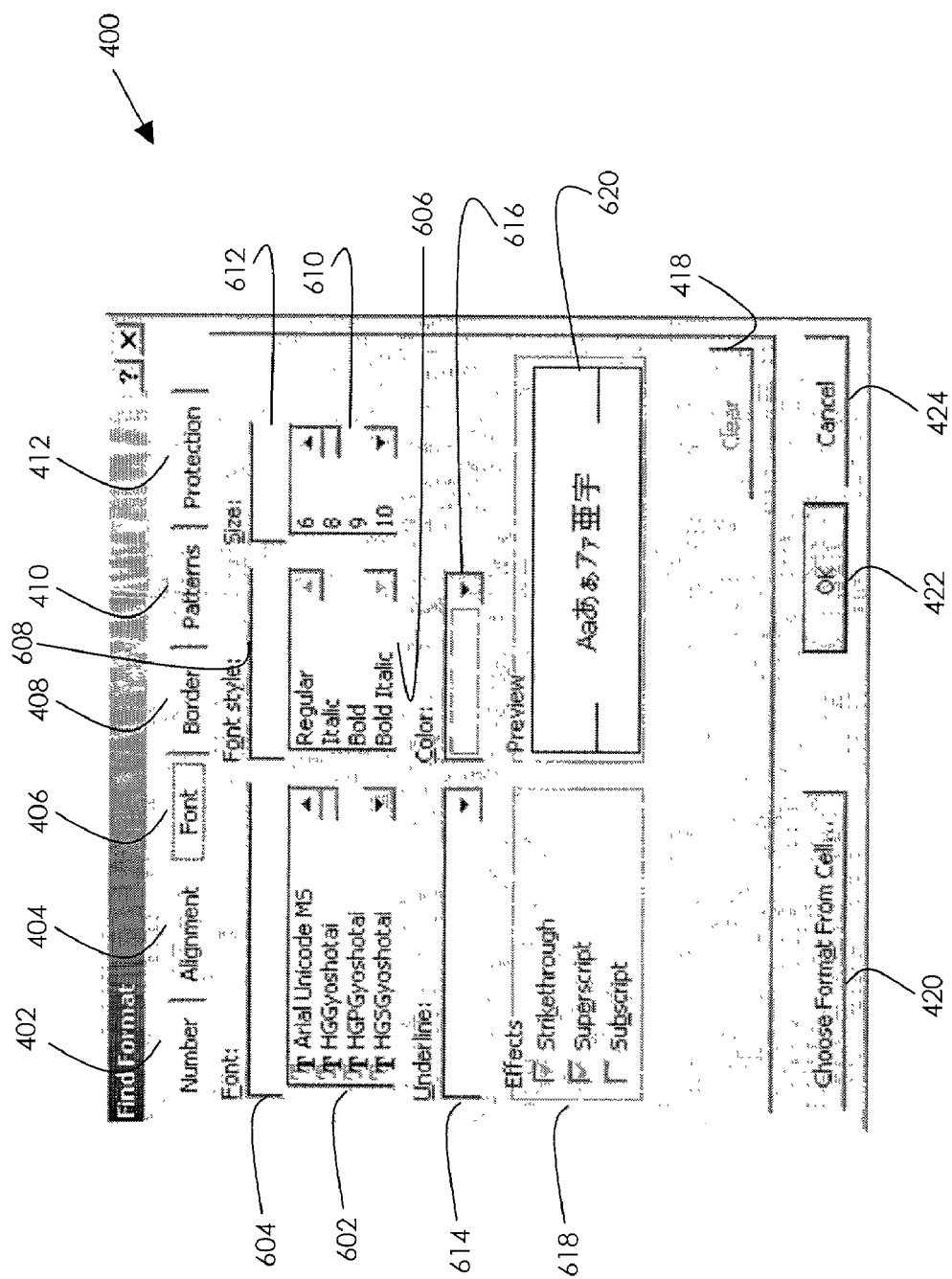
FIG. 6 is an illustration of the format cells dialog box with the Font tab selected.

Referring now to FIG. 6, the format cells dialog box 400 is illustrated with the Font tab 406 selected. With the Font tab selected, the format cells dialog box 400 is used to set the font formatting for the find or replace feature. For example, using the Font tab, a user may select the font, font style, size, underlining characteristics, color and effects of the text to be searched for in the worksheet.

The Font tab 406 includes a font list 602 and a font selection 604. A font type may be selected from the font list 602 and displayed in the font selection 604. The Font tab 406 further includes a font style list 606 and a font style selection 608. A font style (such as regular, italics, bold, bold italic) may be selected from the font style list 606 and the font style selection will be displayed in font style preview 608.

The Font tab 406 further includes a font size list 610 and a font size selection 612. A font size may be selected from the font size list 610 and the font size selection will be displayed in font size preview 612.

The Font tab 406 also includes an underline dropdown menu 614 in which the user can choose whether or not the text to be searched for/replaced with should be underlined.

The Font tab 406 also includes a color dropdown menu 616 in which the user can choose the color of the text to be searched for/replaced with.

The Font tab 406 also includes effects checkboxes 618. These checkboxes are for strikethrough, superscript and subscript and may be ninched. These checkboxes select the effects that the user wants to find/replace with.

The Font tab 406 also includes a preview window 620 in which the user can preview the find/replace font attributes selected.

Figure 7:
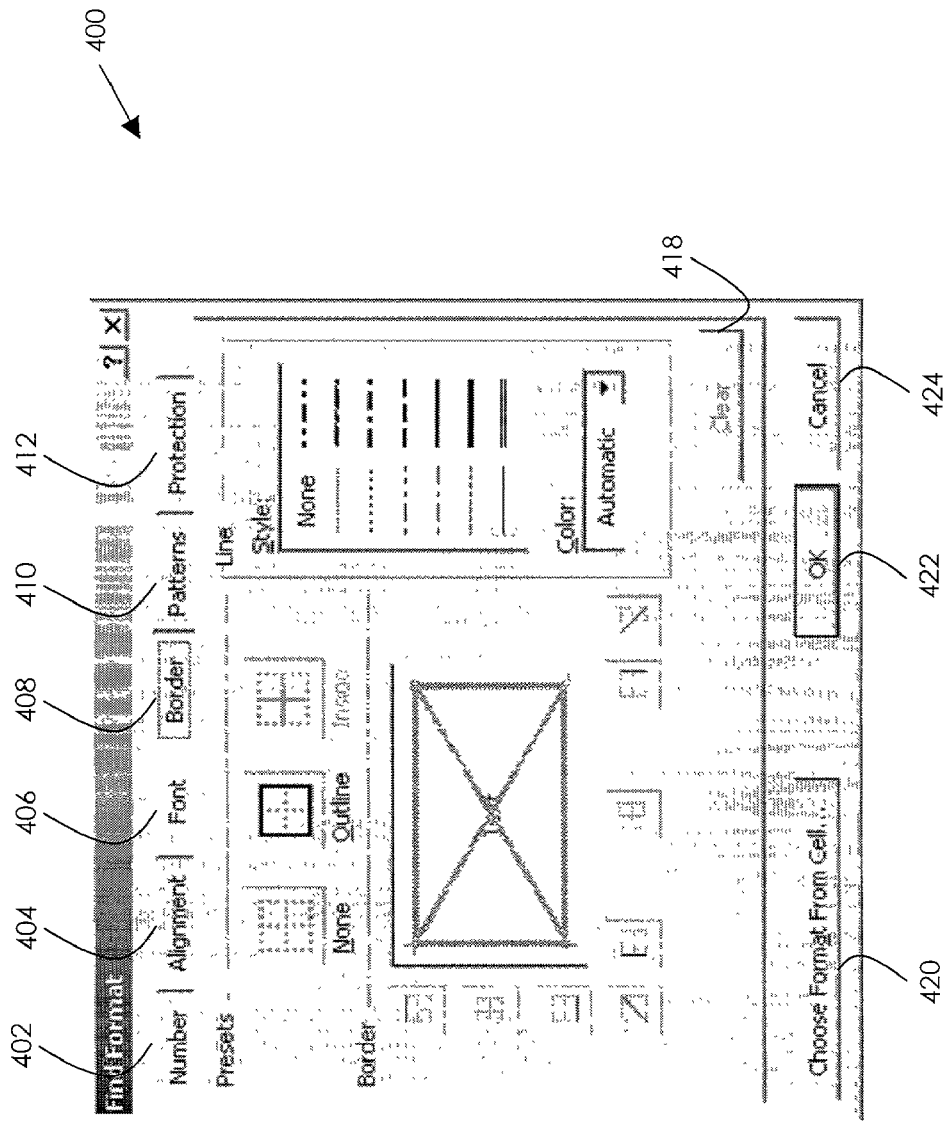
FIG. 7 is an illustration of the format cells dialog box with the Border tab selected.

Referring now to FIG. 7, the format cells dialog box 400 is illustrated with the Border tab 408 selected. With the Border tab selected, the format cells dialog box 400 is used to set the border formatting for the find and replace feature. For example, using the Border tab, a user may select the borders (including line style and line color) of the cells to be searched for in the worksheet.

Figure 8:
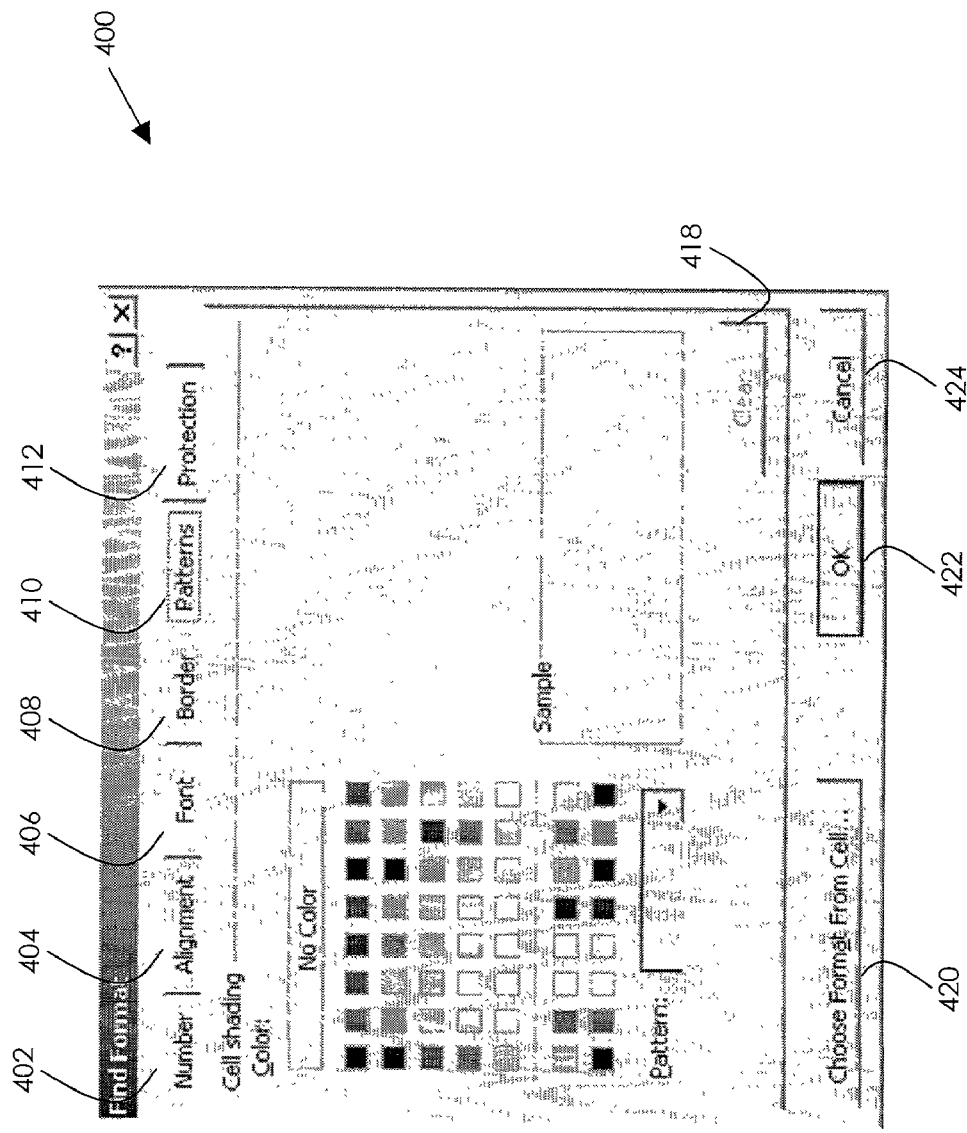
FIG. 8 is an illustration of the format cells dialog box with the Patterns tab selected.

Referring now to FIG. 8, the format cells dialog box 400 is illustrated with the Patterns tab 408 selected. With the Patterns tab selected, the format cells dialog box 400 is used to set the patterns formatting for the find and replace feature. For example, using the Patterns tab, a user may select the color and pattern of the cells to be searched for in the worksheet. The user may also view a preview window in which the user can preview the find/replace cell patterns attributes selected.

Figure 9:
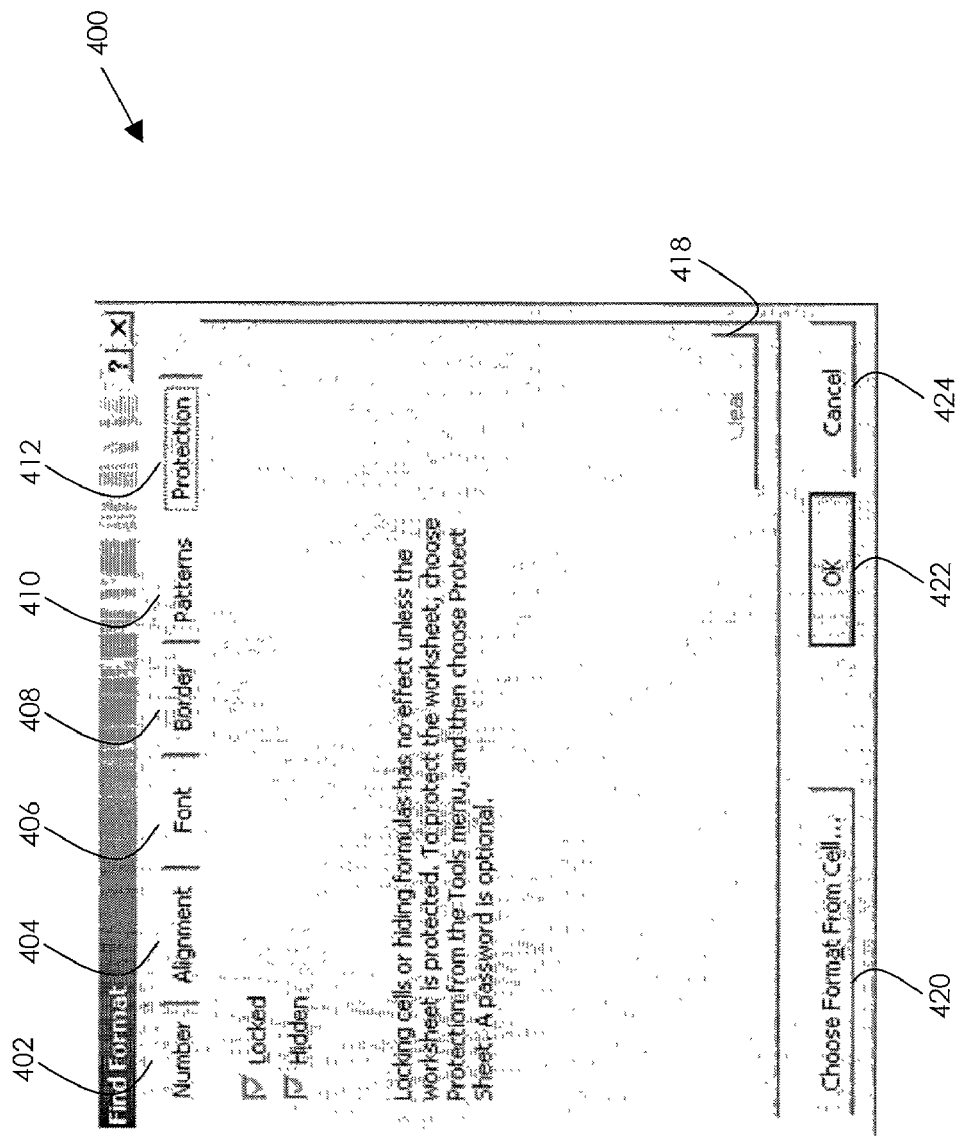
FIG. 9 is an illustration of the format cells dialog box with the Protection tab selected.

Referring now to FIG. 9, the format cells dialog box 400 is illustrated with the Protection tab 412 selected. With the Protection tab selected, the format cells dialog box 400 is used to set the protection formatting for the find or replace feature. In a preferred embodiment, the present invention allows find and replace operations to be performed on locked and hidden attributes. For example, formulas in an expense report may be locked and hidden even though a user is allowed to enter values into unlocked cells. Using prior find and replace features, these formulas were difficult to find and replace because find operations and replace operations had to be performed manually on locked and hidden formulas. There was no way to search on locked and hidden attributes. In one embodiment, the present invention allows find and replace operations on locked and hidden values.

Figure 10:
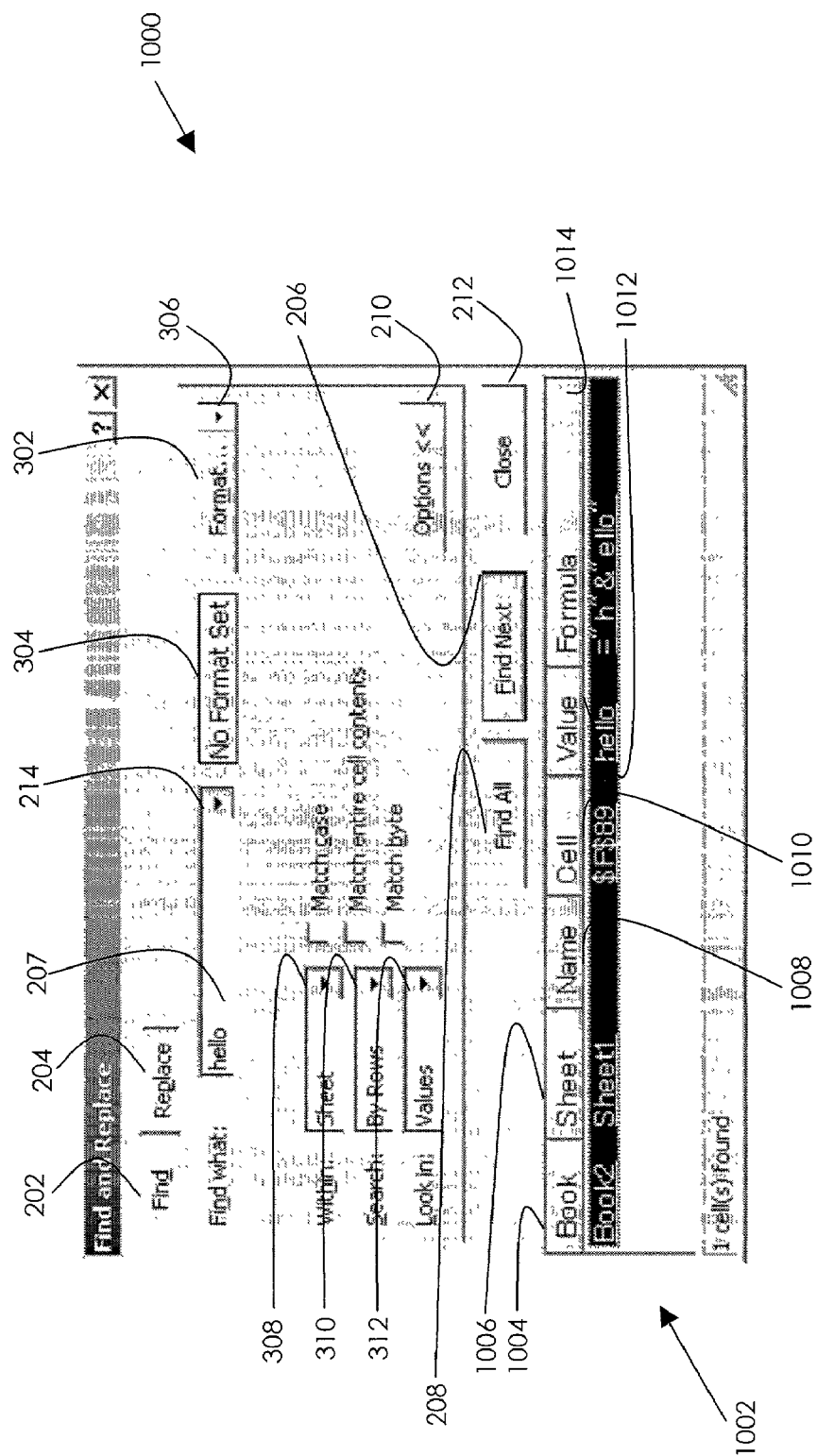
FIG. 10 is an illustration of the results list view of a find and replace dialog box in accordance with an embodiment of the present invention.

FIG. 10 is a results list view 1000 of a find and replace dialog box in accordance with an embodiment of the present invention. The results list view 1000 includes a results list 1002 that provides an overview of all of the places within the work sheet or workbook where a particular piece of text and/or formatting is found. Individual cells matching the requested text and/or formatting attributes are found and listed in the results list 1002. Each identified cell includes a workbook name in a book column 1004 and a worksheet name in a sheet column 1006. The results list also includes a name column 1008 which shows the defined name of a cell, if available. The name column contains defined names for cells. For example, a cell may be named interest rate, while another cell may be named principal.

The results list includes a cell column 1010. Listed in the cell column is the cell field of the identified cell(s). The cell column supports RICI references as well as standard references. The contents of the identified cell(s) that are part of the find results (the value the user sees for the cell) are listed in the value column 1012. The results list also includes a formula column 1014 listing the formulas of the identified cell(s), if applicable.

It should be noted that the entries under the columns of the results list 1002 are links and when a user clicks on an entry in the results list, the application program module moves the display to the selected cell reference. In an embodiment of the invention, multiple cell selection is also possible. If a user selects multiple entries in the results list, those cells will be selected in the sheet. The user could navigate between these cells using the tab key. Clicking the replace tab with multiple selected cells would apply the selected replacement text and/or formatting to the selected cells. Canceling out of the dialog will retain the user's selection choices.

Edits to individual cells may be made using the results list. For example, typing while a results list entry is selected will populate that cell with the typed characters. While active, the results list is updated as edits to the spreadsheet are made.

It should be understood that the results list is obtained when the user selects the Find All button 208 rather than the Find Next button 206. The results list is generated fresh for every search and is intended for use within the find and replace dialog. If the Find Next button is selected after a results list has been displayed, the results list continues to be displayed.

After the find all button is selected and the results list is generated, the first entry in the results list is automatically selected (along with the corresponding cell on the worksheet).

The headers of the results list columns may be dragged to change the size of the columns and clicking on an individual header will sort the list by that item.

If the user selects found cells that span across sheets, the invention will disable the selecting of cells on another sheet.

It should be understood from the foregoing description that the results list for a find operation is not limited to uncovering one match at a time. The results list may present a descriptive, up-to-date list to inform the user of all occurrences of the search term. The find dialog will identify cells and list them with the workbook name, worksheet name and cell reference. The dialog will also display the contents of the cells that are part of the find results.

Figure 11:
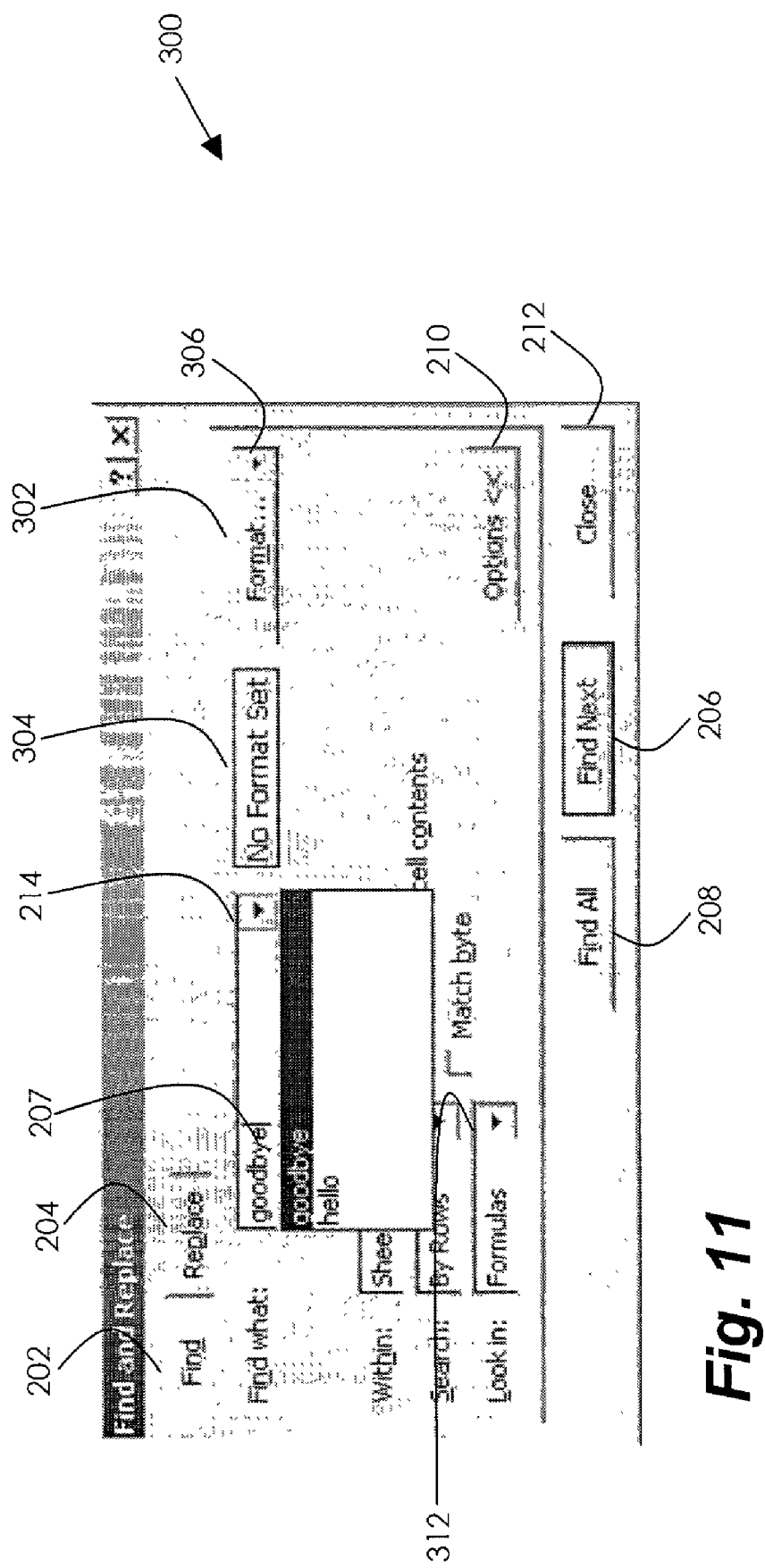
FIG. 11 is an illustration of the expanded view of the find and replace dialog box with a dropdown menu showing previous search terms and formatting attributes.

Referring now to FIG. 11, the expanded view 300 of the find and replace dialog box is illustrated with a dropdown menu showing previous search terms and formatting attributes. Because users often need searches to be repeated within a session, the dropdown button 214, when selected, will list up to 5 previous searches. Typically, the searches will be retained only for the session and the dropdown will not be workbook specific.

The following table lists the case and behavior for retaining the previous search list in accordance with an embodiment of the present invention:

| Case | Behavior |
| --- | --- |
| Reboot application | List cleared |
| File close | List retained, unmodified |
| File new | List retained, unmodified |
| Switch books | List retained, unmodified |

The list of previous searches will be organized chronologically. Duplicate entries of a search will not appear even if the search was performed multiple times.

When an entry from the dropdown is selected, the formatting attributes will be changed to reflect their state at the time that the last search was run. The other settings will not reflect the old state.

Figure 12:
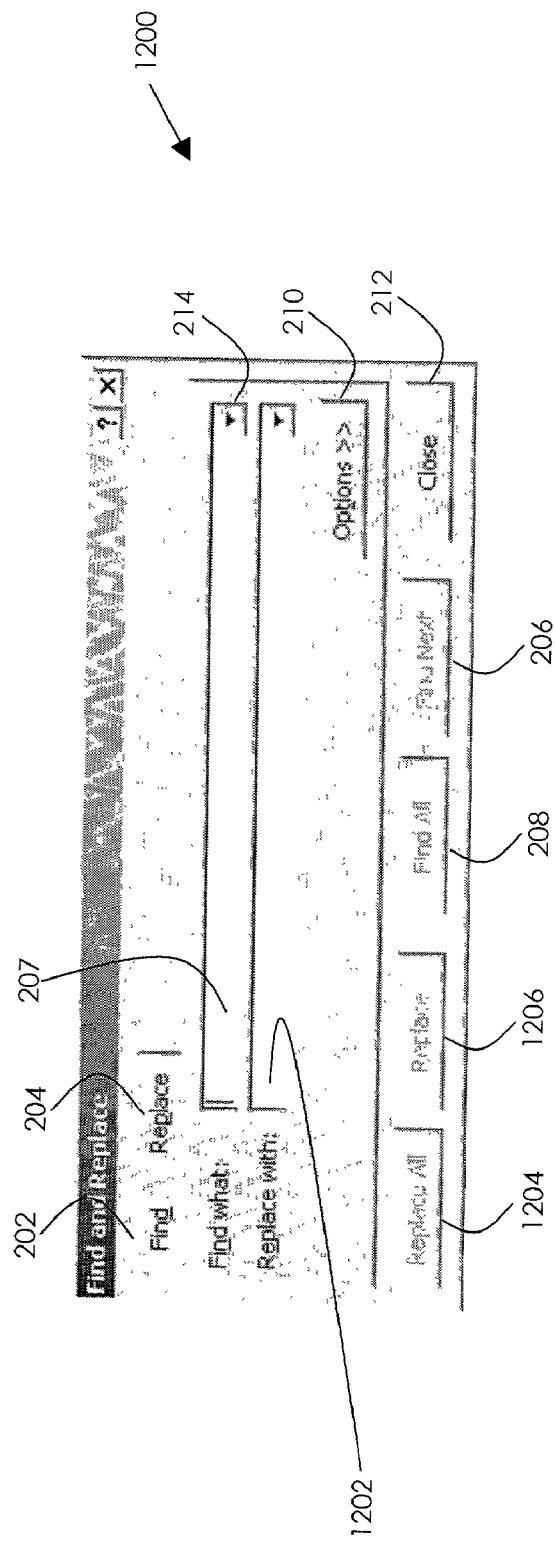
FIG. 12 is an illustration of the slim view of a find and replace dialog box with the replace tab selected.

Referring now to FIG. 12, the slim view 1200 of a find and replace dialog box is illustrated in accordance with an embodiment of the present invention. In FIG. 12, the replace tab 204 has been selected. The display in association with the replace tab 204 is similar to the display in association with the find tab (FIG. 2) and similar numbering is used for similar elements. It should be understood that the format cells dialog box (FIGS. 4-9) operates similarly for the replace function as it does for the find function. However, when used with the replace function, the formatting attributes are used to indicate with what formatting attributes to replace the found cells with.

In addition to the elements described in association with FIG. 2, the replace tab also comprises a replace with field 1202. The replace with field is used to enter text to replace the text in the find what field. The replace button 1206 will replace the active cell (if it matches the text and/or formatting entered in the find what field) with the text and/or formatting entered in the replace with field 1202. The replace all button 1204 will find all occurrences in the active spreadsheet worksheet of the text and/or formatting entered in the find what field 207 and replace them with the text and/or formatting entered in the replace with field 1202.

Replace Behavior

The replace all and replace buttons will appear when the replace tab is clicked on or when Edit_Replace is chosen from the menus. The fields on the replace tab are synchronized with the Find tab. For example, if a user enters "hello" in the Find What field of the Find tab, "hello" will be populated into the Find what field on the replace tab. The same applies for the other options available when the dialog is in the slim view (with the one exception that formulas is the only option in the Look in listbox in the replace tab).

The following rules apply to replace behavior in a preferred embodiment of the present invention. When formatting attributes have been entered for the replace option but no replace text has been entered, then the replace function replaces format but not text. When formatting attributes have not been entered for the replace option but replace text has been entered, the replace function replaces text but not format. When both formatting attributes and replace text have been entered for the replace option, both text and format are replaced.

Figure 13:
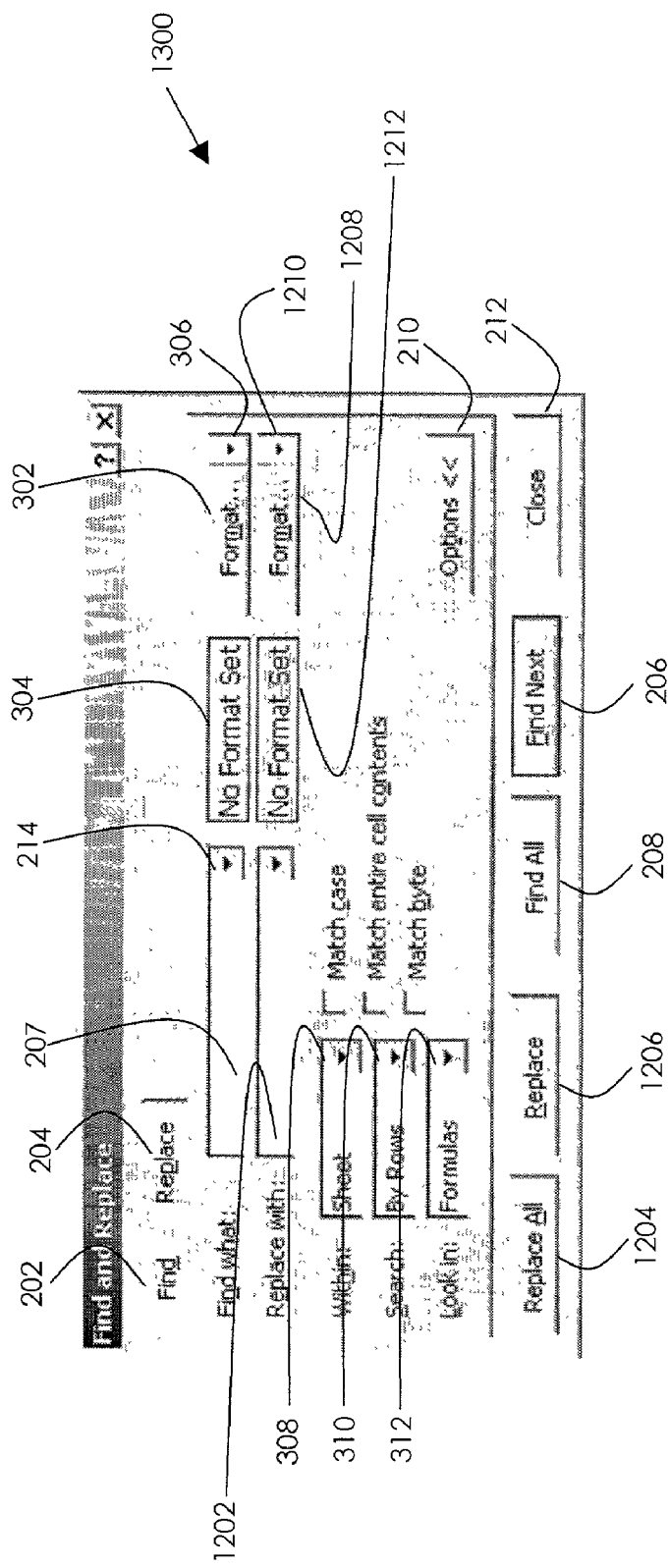
FIG. 13 is an illustration of the expanded view of a find and replace dialog box with the replace tab selected and the options button selected.

Referring now to FIG. 13, the expanded view 1300 of the find and replace dialog box will be described with the replace tab selected and the options button selected. When selected in the slim view 1200, the options button 210 will expand the slim view 1200 to the expanded view 1300. Conversely, when selected in the expanded view 1300, the options button 210 will reduce the expanded view 1300 to the slim view 1200.

The expanded view 1300 includes a replace format button 1208. When selected, the format button 1208 causes a format cells dialog box 400 (FIGS. 4-9) to be displayed as was described above for the find operation. The format cells dialog box allows a user to enter the text and formatting attributes of the cell that is to replace the found text and formatting attributes.

The expanded view 1300 further includes a format preview 1212. After selecting a format to replace the located format, a sample of the replace format will be displayed in the format preview 1212. In FIG. 13, no format has been selected so the format preview displays "No Format Set". The format preview 1212 provides the user with a quick visual indication of what attributes will be replaced should the user select the replace all button 1204 or the replace button 1206. For formatting attributes such as Locked, Hidden or Merged Cells there's no expected preview behavior. Thus, for these attributes, a preferred embodiment of the present invention will add an asterisk to the preview text to illustrate that there are additional formatting items beyond those displayed. The formatting attributes that are clearly visible via the preview are font and patterns.

The expanded view 1300 also includes a format dropdown button 1210. When selected, the format dropdown button 1210 comprises three options: "Format", "Choose Format From Cell", and "Clear Replace Format". When selected, the "Format" option opens the format cells dialog box (FIG. 4) with all options in a ninched state.

When selected, the format dropdown button 1210 also displays an option for "Choose Format From Cell". When selected, the "Choose Format From Cell" option will change the user's cursor into an eyedrop shaped cursor. The user may then move the eyedrop shaped cursor over a cell(s) and select a cell(s). The "Choose Format From Cell" option will determine the attributes of the selected cell(s), apply them to all tabs of the format cells dialog, and enter these attributes into the replace format preview 1212. Thus, a user may use the "Choose Format From Cell" option to simply and quickly change a cell's attributes to those of a selected cell(s).

When selected, the format dropdown button 1210 also displays an option for clearing all formats known as the "Clear Replace Format" option. This option, when selected, restores all tabs to all ninched states. The "Clear Replace Format" option is greyed out if no replace format is selected.

Modelessness

It should be understood that the preferred embodiment of the invention operates modelessly. Modelessness refers to the ability of a user to edit a worksheet while the find and replace dialog is active. In other words, a user can switch back and forth between the find and replace dialog and the active worksheet. After a user selects and edits a worksheet, the user may click back into the find and replace dialog causing the search operation to resume on the current selection.

For example, suppose a user wants to find every instance of the word "GNP". The user selects cell A1 and enters "GNP" in the find what field 207. The user selects the find next button and is taken to cell B33. The user notices an unrelated spelling error, clicks on the worksheet and changes cell B25 to the acronym AGNPU. The user clicks on cell B2 and clicks the find next button. At this point, the spreadsheet program module resumes the find operation from the last selection (B2) and moves the selection to B25.

If the user switches workbooks while the find and replace dialog box is still up, the find operation will resume on the newly selected book. Using the example described above, suppose that the cell changed to AGNPU is on a different book, then after entering the change, the search will resume on that book.

In the case where the user selects a range of cells, the preferred embodiment of the present invention searches that range of cells only. If, after selecting a range of cells, then the user clicks elsewhere on the worksheet while the find and replace dialog box is up, the selection of the range of cells is broken and the find operation then encompasses the full worksheet rather than the originally selected range.

Moveaway

In a preferred embodiment of the present invention, the find and replace dialog box should not obscure the active cell. Thus, the preferred embodiment of the present invention determines the location of the active cell on screen and positions the find and replace dialog box so that it does not obscure the active cell. The moveaway feature is important because of modelessness and the ability of the user to click into and edit cells without closing the find and replace dialog box.

Domain of Searching

In a preferred embodiment of the present invention, the find and replace dialog box maybe used to search across many elements in a single step. Users may search the current sheet, the current selection, or the current workbook.

In text finding, the find and replace dialog box will be able to search for cell values (numeric and non-numeric), formulas, and comments. Searching on cell values or formulas does not limit the search to only the cells that contain values (or formulas). Instead, cell values and formulas are designations that indicate when the dialog box searches a cell that contains a formula, whether the dialog box searches the value of the cell or the cell's underlying formula. For example, a cell may visually appear on the worksheet as "hello", but actually contain the formula="h" & "ello". If the user was searching for the word hello, the user would need to search cell values and not formulas to locate the cell.

Formatting Without Text

In a preferred embodiment, the present invention allows for finding and replacing non-textual elements of spreadsheet cells. For example, suppose a user wants to change all the cells with a blue background to a light yellow so that the spreadsheet prints better. From the edit menu, the user would choose the replace tab. The user would then click the format button to the right of the find textbox. The user would then select blue cell shading in the format cells/find dialog. The user would click the format button to the right of the replace textbox. The user would select light yellow cell shading in the format cells/find dialog and click the Replace All button. This operation replaces all the blue shading with light yellow.

There's a logical gap, however, in how the find and replace dialog box operates with no text entered in the find field. If you bring up the find dialog and just click find next with nothing entered in the find field and no formatting attributes selected, the find and replace dialog doesn't find every blank cell. Instead, no cells are returned. The following table lists the resulting behavior for various combinations of text and formatting attributes:

| Find what: | Format? | Result |
|---|---|---|
| Blank | Yes | finds all cells that have selected format |
| Not blank | No | finds all cells with specified text |
| Blank | No | finds nothing |
| Not blank | Yes | finds all cells with specified text and format |

It should be understood that the options for the look in dropdown menu will not make a difference when there is no text in the Find What box.

Method for Find All Operation

Figure 14:
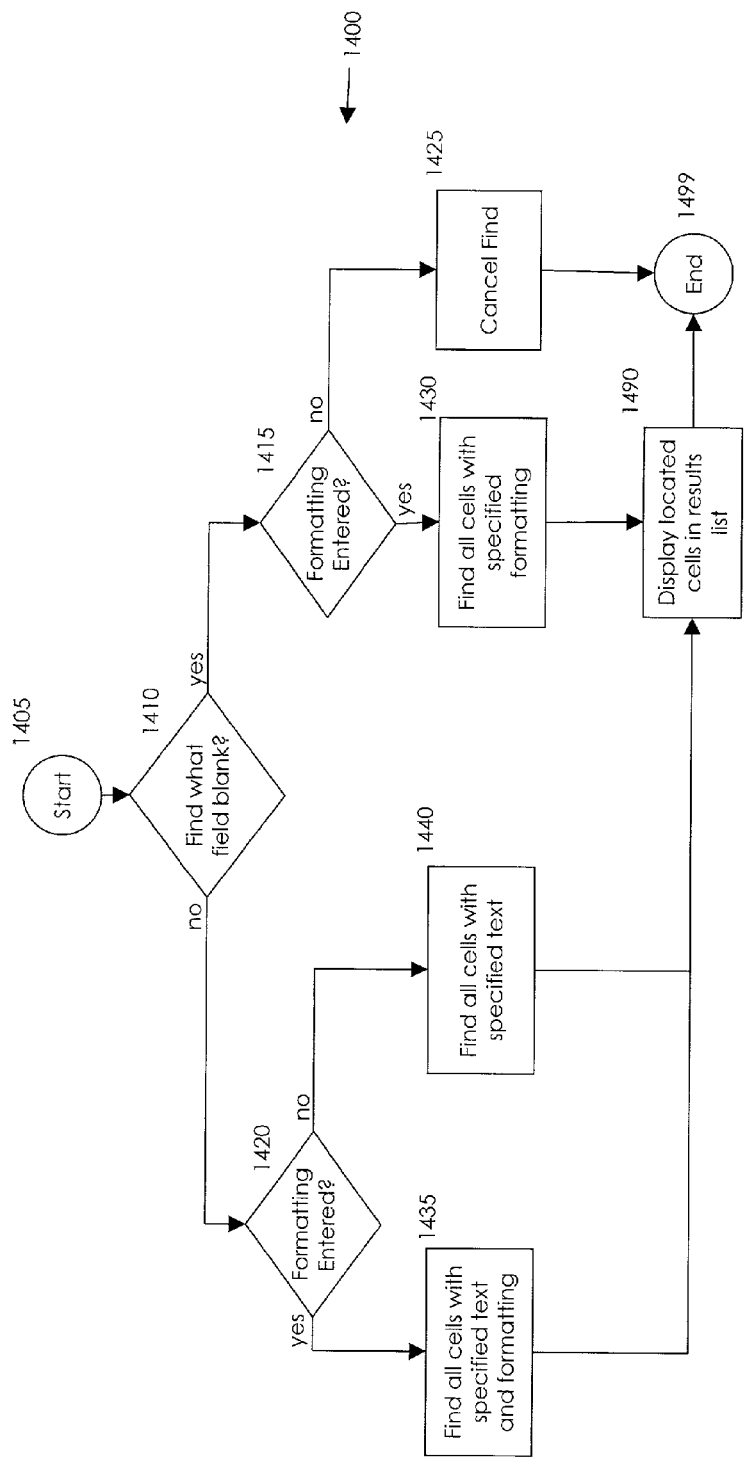
FIG. 14 is a logic flow diagram of a method for performing the find all operation in accordance with an embodiment of the present invention.

Those skilled in the art will appreciate that the logic flow diagrams of FIGS. 14-16 are executed by the processing unit 21 (FIG. 1) in response to instructions that have been incorporated into the application program module 36.

Referring now to FIG. 14, a logic flow diagram of a method 1400 for performing the find all operation in accordance with an embodiment of the present invention will be described.

The method 1400 begins at start step 1405 and proceeds to decision step 1410 when the find all operation is requested (such as when the user selects the find all button 208). At decision step 1410, it is determined the whether there is text in the find what field 207. If so, then the method proceeds to decision step 1420. If not, then the method proceeds to decision step 1415.

At decision step 1415, it is determined whether any formatting attributes have been entered to search for. If not, then the method proceeds to step 1425 where the find operation is canceled and the method ends at step 1499.

However, if at decision step 1415, it is determined there are formatting attributes entered to search for then the method proceeds to step 1430.

At step 1430, all the cells with the specified formatting are located and the method proceeds to step 1490.

At step 1490, the located cells are displayed in a results list and then the method ends at step 1499.

Returning to decision step 1410, if it is determined that there is text in the find what field, the method proceeds to decision step 1420.

At decision step 1420, it is determined whether any formatting attributes have been entered to search for. If so, then the method proceeds to step 1435. If not, then the method proceeds to step 1440.

At step 1435, all the cells with the specified formatting and specified text are located and the method proceeds to step 1490.

At step 1490, the located cells are displayed in a results list and then the method ends at step 1499.

At step 1440, all the cells with the specified text are located and the method proceeds to step 1490.

At step 1490, the located cells are displayed in a results list and then the method ends at step 1499.

Method for Replace All Operation

Referring now to FIG. 15, a logic flow diagram of a method 1500 for performing the replace all operation in accordance with an embodiment of the present invention will be described.

The method 1500 begins at start step 1505 and proceeds to decision step 1510 when the replace all operation is requested (such as when the user selects the replace all button 1204). At decision step 1510, it is determined the whether there is text in the replace with field 1202. If so, then the method proceeds to decision step 1520. If not, then the method proceeds to decision step 1515.

At decision step 1515, it is determined whether any formatting attributes have been entered to replace with. If not, then the method proceeds to step 1525 where the find and replace operation is canceled and the method ends at step 1599.

However, if at decision step 1515, it is determined there are formatting attributes entered to search for then the method proceeds to step 1530.

At step 1530, all the cells with the specified text and specified formatting are located and the method proceeds to step 1535.

At step 1535, the formatting of the located cells is replaced with the replacement formatting and the method ends at step 1599.

Returning to decision step 1510, if it is determined that there is text in the replace with field, the method proceeds to decision step 1520.

At decision step 1520, it is determined whether any formatting attributes have been entered to replace with. If so, then the method proceeds to step 1537. If not, then the method proceeds to step 1540.

At step 1537, all the cells with the specified formatting and specified text are located and the method proceeds to step 1545.

At step 1545, the text and formatting attributes of the located cells are replaced with the replacement text and formatting attributes and the method ends at step 1599.

At step 1540, all the cells with the specified formatting and specified text are located and the method proceeds to step 1550.

At step 1550, the text of the located cells is replaced with the replacement text and the method ends at step 1599.

Method for Choose Format from Cell Operation

Referring now to FIG. 16, a logic flow diagram of a method 1600 for performing the choose format from cell operation in accordance with an embodiment of the present invention will be described.

The method 1600 begins at start step 1605 and proceeds to step 1610 where a selection of a Choose Format from Cell option is made, such as when the user selects the Choose Format from Cell button 420. The method then proceeds to step 1615.

At step 1615, the active cell in the worksheet or workbook is determined. The method then proceeds to step 1620 where the formatting attributes of the active cell are determined. The method then proceeds to step 1625.

At step 1625, the format cell dialog box 400 is populated with the formatting attributes from the selected (activated) cell. The method the ends at step 1699.

Search Direction

The user may have the choice of searching by row (search moves from top to bottom) or by column (left to right except BiDi). Bidi refers to Bi-Directional language versions such as Hebrew and Arabic in which Latin text is handled left to right but Arabic is handled right to left. After that, the search proceeds in the following hierarchy:
1. current sheet
2. current book (next sheet, being the sheet in the tab to the right of the active sheet).

It will be understood from the foregoing description that a preferred embodiment of the present invention provides an enhanced find and replace feature that provides cross-sheet, format finding, a results list, modelessness and a goto/selection model for locating and changing data in bulk.

From the foregoing description, numerous examples of embodiments and uses for the present invention may be understood by those skilled in the art.

One example of a use of the preferred embodiment of the present invention follows. Suppose a management consultant is reviewing a company's internal financial reports. The data is spread across 7 different worksheets (by department and by statement, i.e., balance sheet and cash flows are each in separate workbooks). The consultant wants to find all places in the company that reported net losses. His first step is to search for all red, negative numbers such as (23,000). Eventually, he needs to create an itemized list of all the departments that are supposed to be profitable but instead are cost centers. He needs to be able to search across these different worksheets and find data that suits his criteria. Using the present invention, the management consultant is able to easily search for all red, negative numbers.

A goto/selection example in accordance with an embodiment of the present invention follows. Suppose a user, a data entry clerk compensated on a per project basis, is asked to revise 1998 production figures with 1999 production figures that were estimated by an external firm and delivered on paper. The analysts that he's working for have highlighted in green all of the values he needs to replace. The user needs to select all the green cells and then use the tab key to jump between them to enter in data only in the appropriate cells. Thus, using an embodiment of the present invention, the data entry clerk's job is simplified because he can simply search for green cells and tab between them.

It should be understood that although the foregoing description describes the invention as part of a spreadsheet program module the present invention may be part of any application program module that involves a find and replace dialog.

It should also be understood that an embodiment of the present invention provides a cross-sheet find and replace feature, format finding (such as searching for all cells with a yellow background), a results list (listing each of the search results and updating the search results as cells are edited), cell attribute searches (searching for every cell with the same attributes as the selected cell) and a goto/selection model for locating and changing data in bulk. An embodiment of the present invention allows a combination of navigation and selection. The user may select one or multiple items from the results list and make revisions to the text and formatting attributes of the selected cell(s).

It should be understood that, in a preferred embodiment, the find and replace invention supports the following objects: Border, Borders, Font, Interior, and Numberformat; the following properties: AddIndent, Hidden, HorizontalAlignment, IndentLevel, Locked, MergeCells, Orientation, ShrinktoFit, VerticalAlignment, and WrapText; and the following method: Clear.

It should be understood that the foregoing pertains only to the preferred embodiments of the present invention, and that numerous changes may be made to the embodiments described herein without departing from the spirit and scope of the invention.

We claim:

1. A computer-implemented method for populating a plurality of fields in a find dialog of a spreadsheet program module, the method comprising the steps of:
    choosing a plurality of formatting characteristics of a cell in the spreadsheet;
    editing the plurality of fields in the find dialog to correspond to the plurality of formatting characteristics of the cell; and
    wherein the step of choosing the plurality of formatting characteristics of the cell in the spreadsheet is performed in response to moving a cursor over the cell containing said plurality of formatting characteristics and clicking a mouse button to select the cell, whereby in response to selecting the cell the formatting characteristics of the selected cell are determined and applied to the plurality of fields of the find dialog.

2. The method of claim 1, wherein:
the step of choosing the plurality of formatting characteristics of the cell in the spreadsheet further comprises selecting an option of choosing the formatting characteristics from a formatted cell in the spreadsheet; and
in response to selecting the option, changing the shape of the cursor from a first shape to a second shape distinct from the first shape,
whereby the distinct second shape denotes to a user that moving the cursor over a cell and clicking the mouse button will determine the formatting characterizes of that cell and apply the formatting characteristics of that cell to the fields of the find dialog.

3. The method of claim 2, wherein the second shape of the cursor is shaped like an eyedropper.

4. The method of claim 3 wherein the plurality of fields in the find dialog comprise a plurality of number fields, a plurality of alignment fields, a plurality of font fields, a plurality of border fields, a plurality of pattern fields and a plurality of protection fields.

5. A computer-readable medium having computer-executable instructions for performing the steps recited in claim 4.

6. A computer-implemented method for populating a plurality of fields defining certain formatting characteristics in a find dialog of a spreadsheet program module, the method comprising:
choosing a plurality of formatting characteristics of a formatted cell in the spreadsheet by moving a cursor over the cell and clicking a mouse button to select the cell; and
in response to selecting the cell, determining the formatting characteristics of the selected cell and populating the determined formatting characteristics to the fields in the find dialog.

* * * * *